US008712355B2

(12) United States Patent
Black et al.

(10) Patent No.: US 8,712,355 B2
(45) Date of Patent: Apr. 29, 2014

(54) ANTENNA TUNING ON AN IMPEDANCE TRAJECTORY

(75) Inventors: Gregory R. Black, Vernon Hills, IL (US); William P. Alberth, Prairie Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 230 days.

(21) Appl. No.: 13/221,196

(22) Filed: Aug. 30, 2011

(65) Prior Publication Data

US 2013/0052967 A1    Feb. 28, 2013

(51) Int. Cl.
H04B 1/18    (2006.01)

(52) U.S. Cl.
USPC ............... 455/193.1; 455/121; 455/150.1; 455/289

(58) Field of Classification Search
USPC ............. 455/150.1–197.3, 77, 121, 125, 289
See application file for complete search history.

(56) References Cited

U.S. PATENT DOCUMENTS

| | | | |
|---|---|---|---|
| 3,794,941 | A | 2/1974 | Templin |
| 4,201,960 | A | 5/1980 | Skutta et al. |
| 5,483,688 | A | 1/1996 | English et al. |
| 5,548,821 | A | 8/1996 | Coveley |
| 6,657,595 | B1 | 12/2003 | Phillips et al. |
| 6,993,297 | B2 | 1/2006 | Smith, Jr. |
| 7,167,135 | B2 | 1/2007 | Kipnis et al. |
| 7,199,762 | B2 | 4/2007 | Liu et al. |
| 8,073,514 | B2 | 12/2011 | Black et al. |
| 8,120,259 | B2 | 2/2012 | Kim et al. |

| | | | |
|---|---|---|---|
| 2007/0232367 | A1 | 10/2007 | Kasha et al. |
| 2009/0069042 | A1* | 3/2009 | Wang et al. .................. 455/522 |
| 2010/0041348 | A1* | 2/2010 | Wilcox et al. ................. 455/77 |

(Continued)

FOREIGN PATENT DOCUMENTS

| | | |
|---|---|---|
| EP | 0047354 A1 | 3/1982 |
| EP | 1655850 A1 | 5/2006 |
| WO | 2009033510 A1 | 3/2009 |
| WO | 2011019221 A2 | 2/2011 |

OTHER PUBLICATIONS

Patent Cooperation Treaty, International Search Report and Written Opinion of the International Searching Authority for International Application No. PCT/US2012/052956, Dec. 13, 2012, 11 pages.

(Continued)

Primary Examiner — Dominic E Rego

(57) ABSTRACT

A method, transceiver integrated circuit (IC), and communications device for generating antenna tuning states derived from a pre-established trajectory of tuning states to adjust a detected signal level towards a preset, given value. A tuning state generation (TSG) controller determines whether a detected signal level matches a given value. If the detected signal level does not match the given value, the TSG controller selects an initial preset tuning state from a pre-established trajectory corresponding to a pre-identified operating condition that best matches a current operating condition. The TSG logic forwards the initial preset tuning state to the antenna tuner to trigger impedance transformation. Following generation of the initial preset tuning state, the controller receives an updated detected signal level. If the updated detected signal level fails to match the given value, the controller generates an incremental tuning state that is interpolated between the initial and a final preset tuning states.

18 Claims, 6 Drawing Sheets

(56) References Cited

U.S. PATENT DOCUMENTS

2010/0317297 A1    12/2010   Kratochwil et al.
2011/0012792 A1    1/2011    Krenz et al.
2011/0105023 A1    5/2011    Scheer et al.
2011/0117863 A1    5/2011    Camp et al.
2013/0027129 A1*   1/2013    Langer .......................... 330/127

OTHER PUBLICATIONS

Holopainen, Jari et al.: "Effect of the User's Hands on the Operation of Lower UHF-Band Mobile Terminal Antennas: Focus on Digital Television Receiver", IEEE Transactions on Electromagnetic Compatibility, vol. 53, No. 3, Aug. 2011, ISSN: 0018-9375, pp. 831-841.

* cited by examiner

ANTENNA TUNING ON AN IMPEDANCE TRAJECTORY

BACKGROUND

1. Technical Field

The present invention relates in general to wireless communications devices and in particular to antenna tuning in wireless communications devices.

2. Description of the Related Art

As the number of mode combinations, features and functions in wireless communications devices increase, providing high quality communications with these devices becomes increasingly difficult. In addition, today's wireless communications devices are integrated with many applications, including gaming applications, and other electronic functionality, such as the provision of a camera, for example. While these applications and electronic functions are being used, ensuring that communications signals have a clear, unobstructed path to and from the antenna presents a unique challenge. The communications challenges further increase as a result of the wide range of transmission requirements associated with the various communications modes that the device is expected to support.

Traditional approaches to this challenge involve the use of multiple antennas with spatial-time signal processing. However, as handset designers continue to shrink their products for the user's convenience, the space available for radiating structures is becoming increasingly limited. Limited space and limited sizes of radiating elements causes communications devices to be more susceptible to severe detuning caused by mismatch resulting from hand or body proximity.

BRIEF DESCRIPTION OF THE DRAWINGS

The described embodiments are to be read in conjunction with the accompanying drawings, wherein.

DETAILED DESCRIPTION

Figure 1:
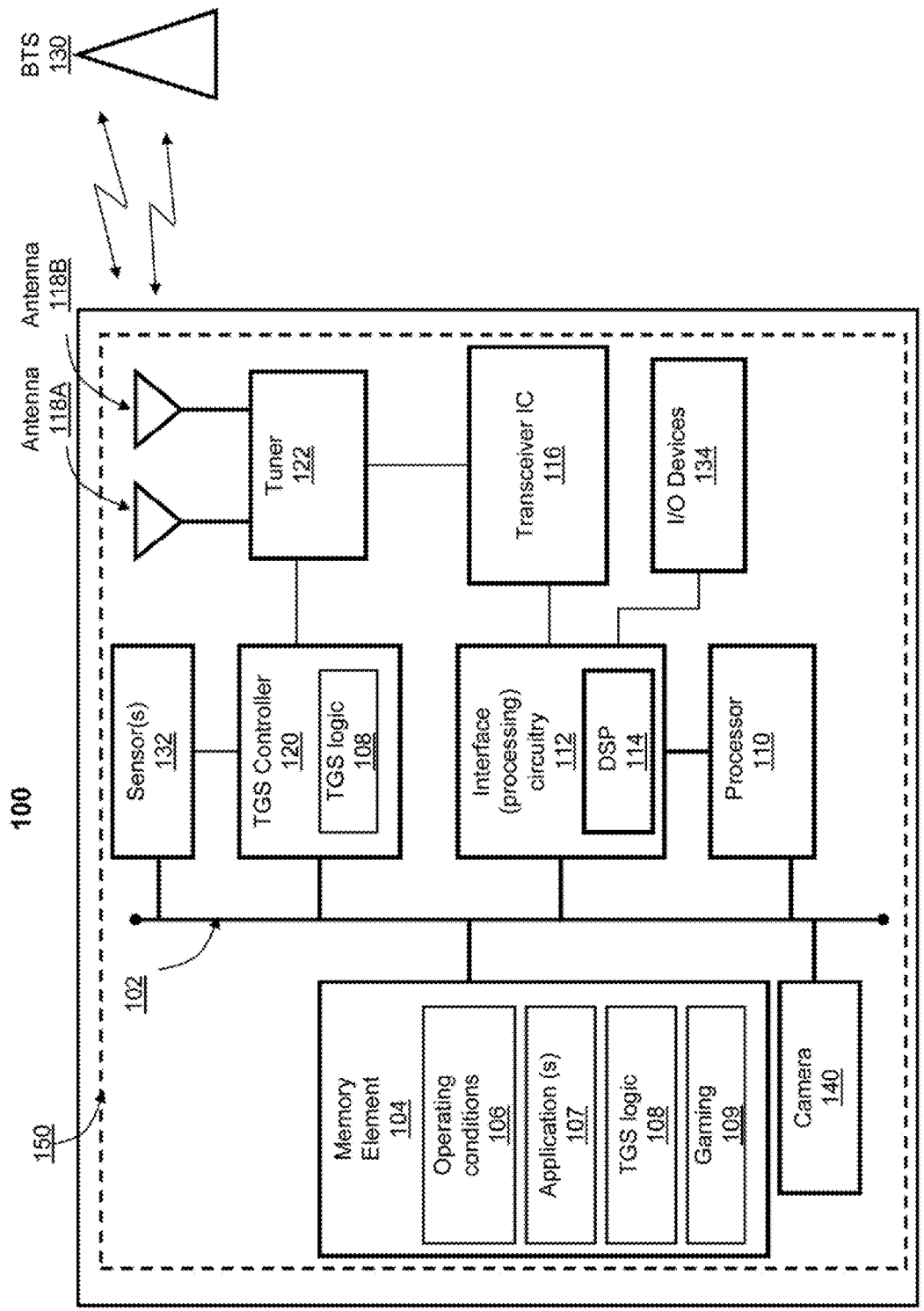
FIG. 1 illustrates an example block diagram representation of a wireless communications device, within which features of the described embodiments can be incorporated, according to one embodiment.

The illustrative embodiments provide a method, transceiver integrated circuit (IC), and communications device for generating antenna tuning states to adjust a detected signal level towards a preset, given value, where the antenna tuning states are derived from a pre-established trajectory of tuning states. A tuning state generation (TSG) controller and/or TSG logic executing on a processor determines whether a detected signal level matches the preset, given value. If the detected signal level fails to match the given value, the TSG controller determines which operating condition of one or more pre-identified operating conditions best matches the current operating condition. Each operating condition supported by the device is respectively associated with a specific pre-established trajectory of tuning states. In response to determining that a particular pre-identified operating condition best matches the current operating condition, the controller selects the initial preset tuning state from a pre-established trajectory corresponding to the particular pre-identified operating condition and forwards the initial preset tuning state to the antenna tuner to enable the antenna tuner to perform impedance transformation. Following generation of the initial preset tuning state, the controller receives an updated detected signal level, and the controller determines whether the updated detected signal level matches the given value. If the updated detected signal level fails to match the given value, the controller generates an incremental tuning state that is interpolated along the trajectory between the initial tuning state and a final preset tuning state.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the described embodiments. The embodiments may thus be described with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the claimed embodiments to embodiments in which different element, feature or concept names are utilized. Thus, each term utilized herein is to be given its broadest interpretation given the context in which that terms is utilized.

As further described below, implementation of the functional features of the invention described herein is provided within processing devices/structures and can involve use of a combination of hardware, firmware, as well as several software-level constructs (e.g., program code) that execute to provide a specific utility for the device. The presented figures illustrate both hardware components and software/logic components within example wireless communications device architecture.

With specific reference now to FIG. 1, there is depicted a block diagram of an example dual antenna wireless communications device 100, within which certain of the functional aspects of the described embodiments may advantageously be implemented. For simplicity, wireless communications device 100 shall be referred to herein simply by the acronym WCD 100. In one embodiment, the wireless communications device is a mobile device, such as a cellular phone, smartphone or laptop, netbook or tablet computer or similar device. As such, WCD 100 can be any type of communication device that experiences different operating conditions and maintains associated plots of an impedance trajectory for use in a feedback loop, such as a two-way radio communication device.

WCD 100 comprises processor 110 and communication interface circuitry 112, which comprises digital signal processor (DSP) 114. Processor 110 and interface circuitry 112 are connected to memory element 104 via signal bus 102. WCD 100 includes a radio frequency (RF) transceiver integrated circuit (IC) 116 that enables WCD to send and receive communication signals. In at least one embodiment, the sending and receiving functions of the transceiver occurs wirelessly, and the wireless communication is facilitated by one or more antennas, e.g., antenna 118A and antenna 118B, to propagate signals from transceiver IC 116.

The number of antennas can vary from device to device, ranging from a single antenna to two or more antennas, and the presentation within WCD 100 of two antennas is merely for illustration. Additionally, the positioning of the two antennas can be at different locations within casing 150 of WCD 100 to account for different operating conditions that can affect one antenna's ability to effectively propagate signals relative to the other antenna. Coupled between transceiver 116 and the at least one antenna, antenna 118A and antenna 118B, is antenna tuner 122.

Antenna tuner 122 performs impedance matching and/or antenna tuning in association with antenna 118A and antenna 118B. Impedance matching circuits can include circuit elements such as inductors, capacitors, and transmission lines, configured in a matching circuit, which transforms the antenna 118A/118B impedance to an input impedance. In one embodiment, the resulting input impedance can be a complex conjugate match of the transceiver 116 output impedance. Tunable impedance matching can be used so that the signal coupled between antenna 118A/118B and transceiver 116 are coupled with maximum power transfer, or with minimum loss, enabling WCD 100 to support communications requirements over a wide range of operating frequencies and use cases. Alternatively, antennas 118A/118B can be tunable antennas which can be tuned to achieve an antenna impedance for maximum power transfer or minimum loss. As another alternative, a combination of tunable matching and tunable antennas can be used. Matching circuit tuning or antenna tuning can be achieved by selecting from among multiple circuit elements via switches, or by employing tunable impedance circuit elements. Among the possible examples of tunable impedance circuit elements are varactor diodes and circuit elements employing voltage responsive dielectric materials such as barium strontium titanate (BST).

WCD 100 is able to wirelessly communicate with, for example, base transceiver system (BTS) 130, or simply basestation, via antenna 118A/118B. WCD 100 also comprises TGS controller 120, which is coupled to antenna tuner 122, and which provides specific functionality that are described in greater detail below. TGS controller 120 can also control antennas 118A/118B when the antennas are configured as tunable antennas (not explicitly shown).

WCD 100 also comprises various other components that provide specialized functions. For example, WCD 100 comprises camera 140. Camera 140 triggers certain positioning and holding characteristics of WCD 100 when camera 140 is operational within WCD 100. WCD 100 also comprises one or more sensor(s) 132, which provides information about certain device conditions to controller 120. Various different types of sensors may be provided within WCD 100, each sensor providing some information associated with one or more operating conditions of WCD 100. For example, sensor 132 may detect user proximity, user contact and/or user gripping of the WCD 100. WCD 100 comprises one or more input/output (I/O) devices 134, which can be utilized based on current device operating conditions and which can, in certain scenarios, contribute to establishing the current device operation conditions. In one embodiment, WCD 100 utilizes application management software 107 and information collected by sensor(s) 132 to determine the operating conditions of the WCD 100.

In addition to the above described hardware components of WCD 100, various features of the described embodiments can be completed and/or supported via software (or firmware) code or programmable logic stored within a controller (e.g., controller 120), memory 104, or other storage (not shown) and executed by one of DSP 114 and processor 110. Thus, for example, illustrated within memory 104 are a number of software, firmware, and/or logic components or modules, including device operating conditions data 106 and gaming and other types of applications When executed, these applications can each contribute to certain device holding and positioning states that may ultimately determine or trigger a current device operating condition. As illustrated, memory 104 also comprises tuning state generation (TSG) logic 108.

In the descriptions which follow, TSG logic 108 represents additional software, firmware, and/or logic components, which execute on processor 110 and/or controller 120 to provide specific functions, as described below. In the described embodiment, TSG logic 108 provides certain executable code that triggers controller 120 to perform certain antenna tuning functions. Additional detail of the functionality associated with TSG logic 108 is presented below with reference to FIG. 2 and subsequent figures.

Certain of the functions supported and/or provided by TSG logic 108 can be implemented via processing logic or code executed by a wireless device processor and/or other device hardware, such as controller 120. Among the software implemented logic functions provided by TSG logic 108, in the described embodiments, are: (a) logic for storing, e.g., in a persistent memory, a plurality of pre-established trajectories of tuning states, and a corresponding plurality of pre-identified device operating conditions and communications modes that are respectively mapped to the various pre-established trajectories of tuning states; (b) logic for determining a detected signal level which indicates a level of power being delivered to an antenna; (c) logic for determining whether the detected signal level matches a preset, given value; (d) logic for, in response to the detected signal level failing to match the given value, determining a current operating condition of the communications device; (e) logic for determining which of the one or more pre-identified operating conditions that are respectively associated with specific pre-established trajectories of tuning states best matches the current operating condition; and (f) logic for, in response to determining that a particular pre-identified operating condition of the one or more pre-identified operating conditions best matches the current operating condition, selecting an initial preset tuning state from a pre-established trajectory corresponding to the particular pre-identified operating condition that best matches the current operating condition; and (g) logic for forwarding the initial preset tuning state to the antenna tuner to enable the antenna tuner to perform impedance transformation.

In one embodiment, the TSG logic further provides: (h) logic, following a generation of the initial preset tuning state, for: receiving an updated detected signal level, determining whether the updated detected signal level exceeds the given value; and, in response to the updated detected signal level failing to match the given value, generating at least one next tuning state from a plurality of other tuning states that are interpolated along the trajectory between the initial and the final preset tuning states, where the next tuning state is generated based on at least one of a previous tuning state generated, the updated detected signal level, operating conditions, and the active communications mode of the device.

Figure 2:
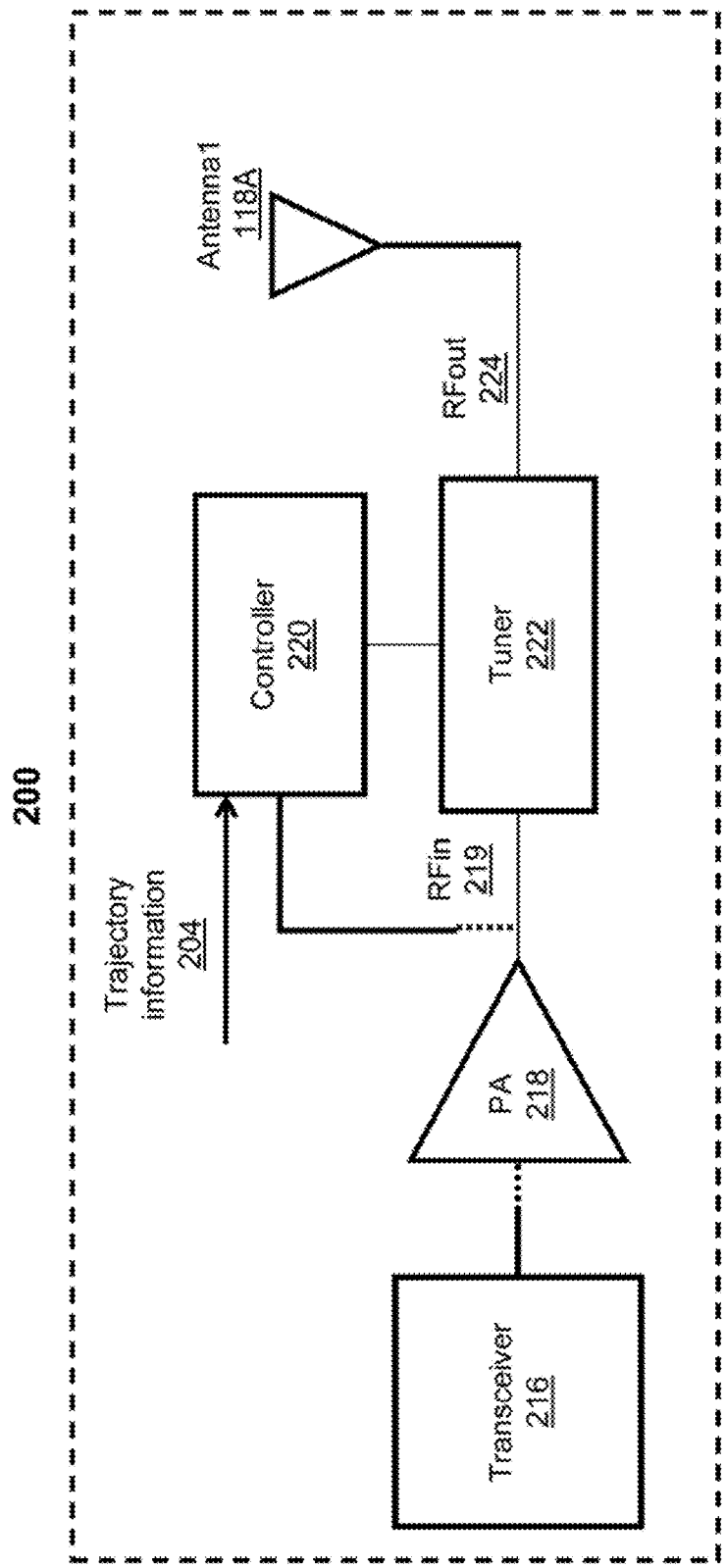
FIG. 2 illustrates a block diagram representation of radio frequency communications components (RFCCs), including a controller, an antenna tuner and an antenna selection switch, of a wireless communications device (WCD), according to one embodiment.

With reference now to FIG. 2, there is presented a block diagram representation of radio frequency communications components (RFCC) 200, in a wireless communications device (WCD), such as WCD 100 of FIG. 1, according to one embodiment. RFCC 200 includes a transceiver 216 coupled to a power amplifier (PA) 218 which is further coupled to antenna tuner 222. Also coupled to antenna tuner 222 is controller 220. Additionally, antenna tuner 222 is connected to first antenna 118.

For uplink signals, antenna tuner 222 receives RFin signal 219 at an input port of antenna tuner 222. In one embodiment, RFin signal 219 represents a signal originally propagated by a transceiver (e.g., transceiver 216), amplified by power amplifier 218 and then propagated to antenna tuner 222. However, to facilitate description of the described embodiments, RFin signal 219 may be referred to herein simply as a signal propagated by transceiver 216. As such, antenna tuner 222 yields RFout signal 224 at an output of antenna tuner 222. A complex value of RFout signal 224 depends on a level of impedance transformation provided by antenna tuner 222. A preferred optimization of the tuner 222 involves maximizing the RFout signal power delivered to the antenna 118. For downlink signals, antenna tuner 222 receives RFout from the antenna 118 and propagates to a receiver (not shown) located in transceiver 216. Since antenna tuner 222 comprises at least approximately bilateral linear circuits, a given impedance transformation for the uplink or forward signal path is at least approximately in an optimal range for the downlink or reverse signal path as well.

In one embodiment, antenna tuners can provide impedance matching to the antenna resonator structure for desired operating frequencies. In addition, antenna tuners can directly adjust the resonator structure of the antenna. This adjustment of the resonant structure of the antenna can be accomplished if the antenna tuner comprises one or more microelectric machine (MEM) switches, or by other methods known in the art. In one embodiment, MEMs are integrated into the antenna structure and modify the lengths of the antenna resonator when the MEMs are actuated. The antenna tuner may also include an expanded functionality that enables the antenna tuner to provide (a) adjustments to the antenna resonance as well as (b) impedance matching. In the descriptions that follow, antenna tuning functionality may be described mainly from the perspective of an impedance matching antenna tuner. However, electrical length tuning as is provided by an electrical length tuning antenna tuner apply as well to these descriptions. Furthermore, in one embodiment, the electrical length tuner may be integrated with both impedance matching functionality and electrical length or resonant frequency tuning functionality.

Figure 5:
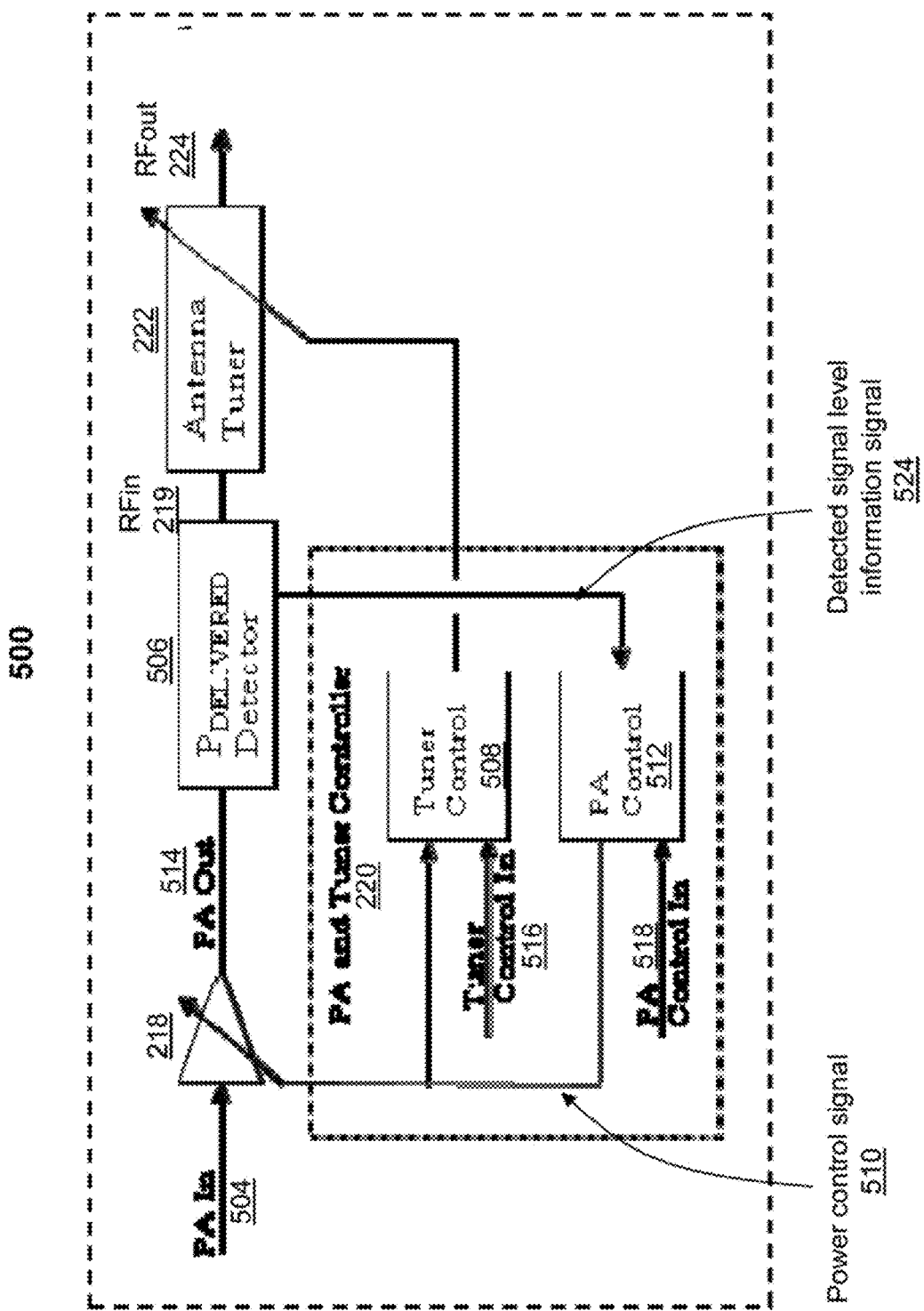
FIG. 5 is a block diagram illustrating a power control and antenna tuning feedback circuitry, according to one embodiment.

Referring again to FIG. 2, and with reference also to FIG. 5, the at least one antenna, first antenna 118A, has an input impedance that varies in response to changes in operating conditions of the communications device. Antenna tuner 222 performs antenna tuning to compensate for the various changes in operating conditions of the communications device, based on control signals provided by antenna tuner controller 220. Antenna tuner controller 220 is connected within a feedback configuration, as illustrated in FIG. 5, which configuration provides antenna tuner controller 220 with feedback information to enable antenna tuner controller 220 to determine a detected signal level.

Figure 3:
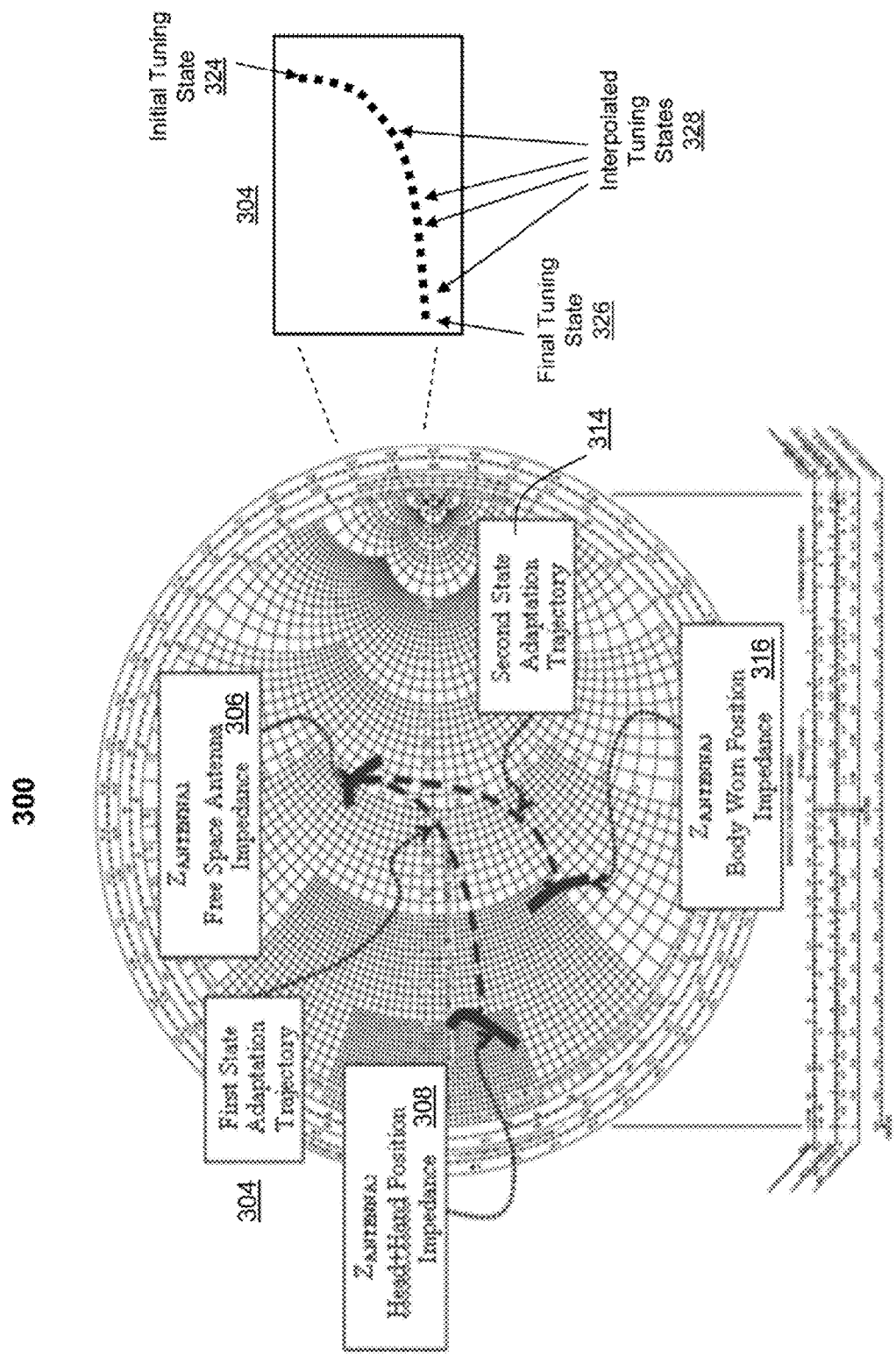
FIG. 3 illustrates a Smith chart that is utilized for antenna impedance matching, according to one embodiment.

In one embodiment, antenna tuner controller 220 receives the feedback information from a power delivered detector (FIG. 5), which may be implemented with the use of a directional coupler. Antenna tuner controller 220 uses the detected signal level, as well as pre-established trajectories of tuning states, such as, trajectories information 204, to generate antenna tuning states. Antenna tuner controller 220 forwards the tuning states to antenna tuner 222 to enable antenna tuner 222 to adjust radio frequency (RF) signal power corresponding to the detected signal level towards a preset, given value. The given value is one of: (a) a maximum value, where the detected signal represents at least one of a delivered power to the antenna and a delivered power to the antenna match; and (b) a minimum value, wherein the detected signal represents at least one of a reflected power from the antenna match, a return loss magnitude and a standing wave ratio. In one embodiment, the delivered power to the antenna match is substantially equivalent to the power delivered to the antenna tuner based on a level of antenna impedance matching provided, minus the transducer losses of the circuit elements in antenna tuner 222. In a particular implementation, the delivered power to the antenna match is the power available out of the transceiver into an ideal 50 Ohm load, minus the mismatch loss, where the mismatch loss is a function of the impedance matching. The reflected power from the antenna match is substantially equivalent to the power reflected by the antenna tuner 222 based on a level of antenna impedance mismatch. The antenna tuning states are generated from a pre-established trajectory of tuning states. FIG. 3 illustrates a possible sequence of points along an example trajectory 304. In particular, the generated antenna tuning states represent a sequence of points along a selected, pre-established trajectory of tuning states that comprise (a) an initial preset tuning state 324 and a final preset tuning state 326 and (b) a plurality of other tuning states 328 that are interpolated between the initial and the final preset tuning states 324 and 326. In a simple example, antenna tuner 222 comprises M tunable capacitors. A trajectory of N tuning states is defined for each capacitor Cm, comprising initial capacitance of $C_{m,i}$, and final capacitance of $C_{m,i}+\Delta C_m$. The trajectory of N tuning states includes the states $C_{m,i}+n*\Delta C_m/N$ for n from 0 to N−1, for each tunable element m=1 to M. These trajectories of tuning states are retrieved and/or accessed by antenna tuner controller 220 from persistent memory storage, e.g., memory 104 within communications device 100 (FIG. 1).

The communications device (e.g., WCD 100) stores in a persistent memory a plurality of pre-established trajectories of tuning states, and the respective plurality of pre-identified device operating conditions and communications modes. The plurality of pre-identified device operating conditions and communications modes are respectively mapped to the specific pre-established trajectories of tuning states. The device operating conditions can include (a) device positioning, (b) user handling of the device and (c) activation of particular functions of the device, among others. Thus, in response to receipt of the detected signal level that is provided by an information signal, such as, detected signal level signal 524 from FIG. 5, the antenna tuner controller 220 determines whether the detected signal level matches an given value; and if the detected signal level matches the given value, antenna tuner controller 220 determines a current operating condition of the communications device. Antenna tuner controller 220 then determines whether at least one of the one or more pre-identified operating conditions that are respectively associated with specific pre-established trajectories of tuning states matches the current operating condition. In response to a determination that at least one of the one or more pre-identified operating conditions that are respectively associated with specific pre-established trajectories of tuning states matches the current operating condition, antenna tuner controller 220 determines which of the one or more pre-identified operating conditions that are respectively associated with specific pre-established trajectories of tuning states best matches the current operating condition. In response to determining that a particular pre-identified operating condition of the one or more pre-identified operating conditions best matches the current operating condition, antenna tuner controller 220 selects a pre-established trajectory corresponding to the particular pre-identified operating condition that best matches the current operating condition.

In one embodiment, antenna tuner controller 220 first selects the initial preset tuning state from the pre-established trajectory to send to antenna tuner 222. The selection may be completed following analysis of the detected signal level, in one embodiment, or without analysis of the detected signal level, in an alternate embodiment. In another embodiment, antenna tuner controller 220 first selects another tuning state, which is different from the initial tuning state, from the pre-established trajectory, based on analysis of the current detected signal level. Antenna tuner controller 220 then forwards the initial preset tuning state or the first selected other tuning state to the antenna tuner to enable the antenna tuner to perform impedance transformation.

Following the generation of the initial preset tuning state, the antenna tuner controller 220 receives an updated or another detected signal level, and antenna tuner controller 220 determines whether the updated detected signal level matches the preset given value. In response to the updated detected signal level failing to match the preset given value, antenna tuner controller 220 generates a second tuning state. In one embodiment, the second tuning state is one of the plurality of other tuning states that are interpolated between the initial and the final preset tuning states. In particular, antenna tuner controller 220 generates a first interpolated tuning state. An interpolated tuning state is generated based on at least one of a previous tuning state generated, a corresponding detected signal level, operating conditions, and the active communications mode.

For example, the operating conditions and the active communications mode provide an indication of the level of stability of conditions associated with the device usage and operation. The level of stability of conditions may be used to determine if the trajectory used to generate a tuning state in response to a preceding feedback remains valid or whether a switch to a different trajectory is required. The value of the updated or corresponding detected signal level and the previous tuning states generated are used collectively to specify and generate an incremental level of tuning state adaptation. This incremental level of tuning state adaptation is provided relative to a previously selected or generated tuning state, and corresponds to an estimated level of impedance adjustment that is required to cause a pre-determined and preset given signal level to be received or detected at a radiating element. Antenna tuner controller 220 continues to generate tuning states as long as a current or updated detected signal level fails to match the preset given value. A detected signal level "matches" the given value when the detected signal level is within a pre-established threshold range of the given value. However, antenna tuner controller 220 stops generating any tuning states in response to receipt of a detected signal level that matches the preset given value. Antenna tuner controller 220 resumes a generation of tuning states in response to receipt of a detected signal level that fails to match the preset given value.

In one embodiment, following generation of the second tuning state, if a current detected signal level does not match the given value, antenna tuner controller 220 generates a "next tuning state" or "second interpolated tuning state" based on detected signal levels and at least one of: (a) the initial tuning state; (b) a first selected tuning state that is different from the initial tuning state; (c) the second tuning state; (d) the first interpolated tuning state sequentially generated after the generation of the initial tuning state or after the first selected tuning state; and (d) another tuning state that was generated after the second tuning state or was sequentially generated after a generation of the second tuning state. Antenna tuner controller 220 forwards the next tuning state or the second interpolated tuning state to the antenna tuner 222.

The first interpolated tuning state is sequentially higher in tuning state position than the initial tuning state within the trajectory. The initial tuning state is sequentially a lowest positioned tuning state of the trajectory, while the final tuning state is sequentially a highest tuning state of the trajectory. In one embodiment, a lower positioned state (i.e., relative to a higher tuning state) is a tuning state that provides or corresponds to a lower level of impedance tuning. On the other hand, a relatively higher positioned state is a tuning state that provides or corresponds to a relatively higher level of impedance tuning.

The next tuning state is one of (a) a sequentially higher tuning state within the selected trajectory than a previously selected sequential tuning state that was sent to the antenna tuner and (b) a sequentially lower tuning state than the previously selected sequential tuning state. Antenna tuner controller 220 selects the sequentially higher tuning state as the next tuning state in response to at least one of the following sets of conditions: (i) the previously selected sequential tuning state is a sequentially increasing tuning state from another tuning state towards the final tuning state of the trajectory and the current detected signal level exceeds the preceding detected signal level; and (ii) the previously selected sequential tuning state is a sequentially decreasing tuning state from the other tuning state towards the initial tuning state of the trajectory and the current detected signal level is less than the preceding detected signal level.

Antenna tuner controller 220 selects the sequentially lower tuning state as the next tuning state in response to at least one the following sets of conditions: (i) the previously selected sequential tuning state is a sequentially increasing tuning state from another tuning state and the current detected signal level is less than the preceding or first detected signal level; and (ii) the previously selected sequential tuning state is a sequentially decreasing tuning state from the other tuning state and the current or second detected signal level exceeds the first detected signal level.

The previously selected sequential tuning state is sequentially generated after the other tuning state. In one embodiment, the next tuning state and the previously selected sequential tuning state are interpolated tuning states. In a related embodiment, the previously selected sequential tuning state is the second tuning state. Furthermore, in the related embodiment, the other tuning state is either the initial tuning state or the first selected tuning state that is different from the initial tuning state. In an alternate embodiment, the previously selected sequential tuning state is a tuning state that is generated after a generation of the second tuning state. In the alternate embodiment, the other tuning state is a tuning state that is generated after a generation of (a) either the initial tuning state or the first selected tuning state that is different from the initial tuning state or (b) both the initial tuning state and the first selected tuning state.

In one embodiment, antenna tuner controller 220 selects a current tuning state from among a pair of adjacent tuning states. These adjacent tuning states are either sequentially above or sequentially below a most recently selected tuning state. This selection of one of the pair of adjacent tuning states is based on whether the current detected signal level is greater than or less than the preceding detected signal level. However, in another embodiment, antenna tuner controller 220 selects a current tuning state from among the complete or universal set of tuning states within the selected trajectory. This selection from the universal set of tuning states is based on (a) whether the current detected signal level is greater than or less than the preceding detected signal level and (b) an extent by which the current detected signal level differs from the preceding detected signal level.

Referring again to the operating conditions of the communications device and selection of a trajectory, in one embodiment, in response to determining that the current operating condition does not match any of the pre-identified operating conditions, controller 220 generates tuning states using values selected from at least one of: (a) a first trajectory that is associated with a specific pre-identified operating condition that has a highest level of correlation with the current operating condition; and (b) a second trajectory that is predicted based on a current trend in operating conditions and a corresponding set of previous trajectories utilized. With the latter method, the second trajectory corresponds to a pre-identified operating condition that has at least a threshold level of correlation with the current operating conditions.

In another embodiment, in response to a determining that the current operating condition does not match any of the pre-identified operating conditions, the antenna tuner controller 220 generates tuning state values by extrapolating at least one pre-established trajectory that corresponds to a selected pre-identified operating condition to derive a new trajectory of tuning state values. The selected pre-identified operating condition(s) satisfies a threshold, minimum level of correlation with the current operating conditions, and the new trajectory and the constituent tuning states are calculated based on a determined level of correlation between the selected pre-identified operating condition and the current operating condition.

Turning now to FIG. 3, a Smith chart that is utilized for antenna impedance matching is illustrated, according to one embodiment, where complex reflection coefficients are plotted in two dimensions. Chart 300 comprises first state adaptation trajectory 304 and second state adaptation trajectory 314. A particular state adaptation trajectory is associated with a particular frequency of operation. Along the trajectory, e.g., first state adaptation trajectory 304, the different interpolated tuning states 328 correspond to different values of the reflection coefficient, and the different values indicate different levels of impedance mismatch. In general, impedance mismatch is characterized in terms of reflection coefficient. Therefore, it follows that different values of the reflection coefficient correspond to various levels of required impedance tuning Each complex reflection coefficient point, F, on the smith chart corresponds to a complex antenna input impedance $Z_{ANTENNA}$ by the formula, $Z_{ANTENNA}=(\Gamma-r_0)/(\Gamma+r_0)$, $r_0$ is the reference impedance, typically 50Ω. A matching circuit having output impedance $Z_{ANTENNA}*$, which is the complex conjugate of $Z_{ANTENNA}$. This provides maximum power transfer of the RFout signal of FIG. 2 into the antenna. Furthermore, the detected signal level is impacted by the level of impedance mismatch.

First state adaptation trajectory 304 provides an initial tuning state 324 that corresponds to device operation with an initial or starting impedance. For example, the initial tuning state 324 may correspond to device operation in which a signal path to and from an antenna is substantially unobstructed, such as the "free-space" device operating condition where the antenna is not affected by the user's head or hand. First state adaptation trajectory 304 also provides a final tuning state 326 in which the communications device is being held in a user's hand and is in contact with the user's head. Thus, the initial tuning state 324 and the corresponding "free-space" device operating condition are associated with a pre-established free space antenna impedance 306. The final tuning state 326 and the corresponding "head-hand" device operating condition are associated with a pre-established "head-hand" position impedance 308. In this way the antenna tuner finds the given matching circuit from a range of matching circuits, each corresponding to a degree of impedance mismatch, from a virtually unloaded device characterized in "free space", to a heavily loaded device characterized in a "head hand" position held close to the head with a tight hand grip.

Similar to first state adaptation trajectory 304, second state adaptation trajectory 314 provides an initial tuning state, state 306, that corresponds to the "free-space" device operating condition. Second state adaptation trajectory 314 provides a final tuning state that corresponds to a pre-established "Body Worn" position impedance 316, in which the communications device is being carried in a user's pocket or device holder that may be secured to the user's body. The final tuning state and the corresponding "body worn" device operating condition are associated with a pre-established "body worn" position impedance.

In chart 300, although the "head-hand" device operating condition and the "body worn" device operating condition share an initial tuning state, the various trajectories are not required to share an initial tuning state. Thus, the example of chart 300 simply illustrates an arbitrary example of tuning states and is not intended to limit initial tuning states to a same tuning state.

In one embodiment, device conditions correspond to particular complex impedance values. As a result, controller 220 can determine which trajectory is to be utilized to generate tuning states by comparing information that define current device conditions with information that define the pre-established device conditions. The information that defines current and pre-established operating conditions can therefore include the complex impedance values that correspond to the respective operating conditions.

To enable an efficient search mechanism and/or searching function by controller 220, a pre-selected set of trajectories are utilized and are stored within persistent memory. In particular, the communications device stores the plurality of pre-established trajectories of tuning states and an associated plurality of pre-identified device operating conditions and communications modes in at least one and potentially several tables (e.g., Table 400 of FIG. 4) within the persistent memory, such as memory 104 of FIG. 1, to enable the antenna tuner controller 220 to efficiently search and generate tuning states.

Figure 4:
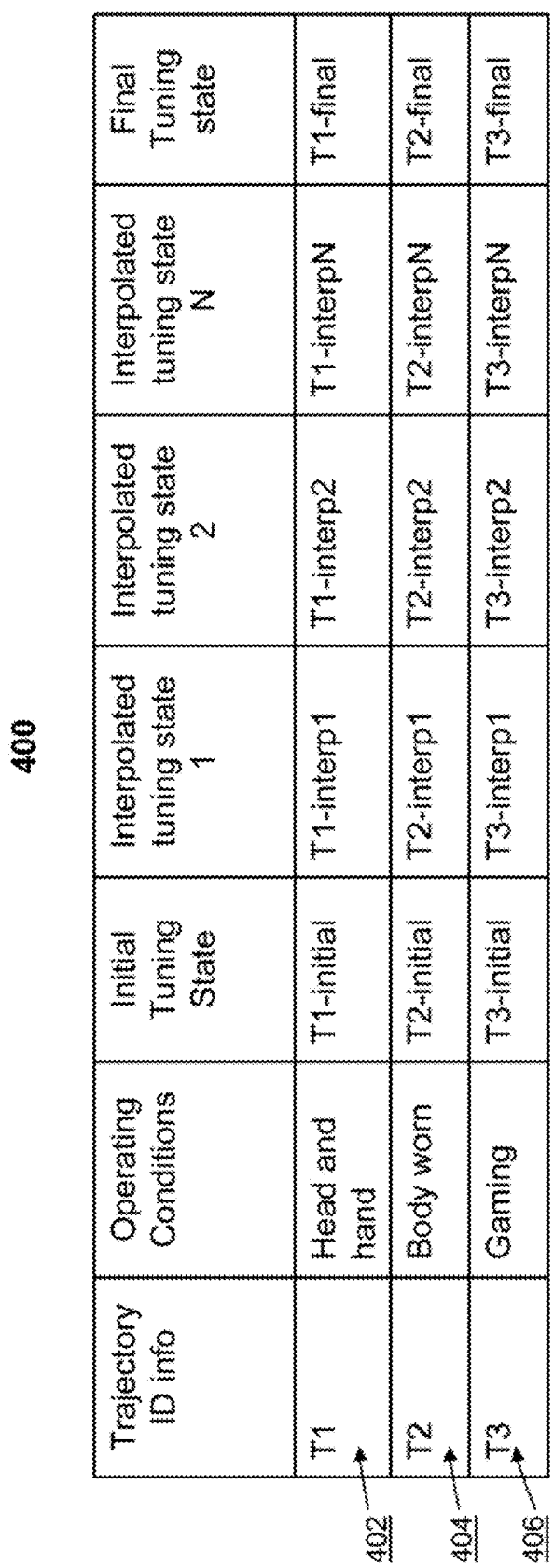
FIG. 4 is an example table providing information about various pre-established and pre-selected adaptation trajectories, corresponding device operating conditions, and tuning states, according to one embodiment.

Referring to FIG. 4, there is presented an example table providing information about various pre-established and pre-selected adaptation trajectories, with their corresponding device operating conditions, and tuning states, according to one embodiment. Three different trajectories are identified within separate rows of Table 400. Specifically, first row 402, provides information about first trajectory "T1", corresponding to "head and hand" device operating condition. First trajectory, T1, can correspond to trajectory 304 of FIG. 3. Second row 404 provides information about second trajectory "T2", corresponding to a device carried on a user's body in a "body worn" position. Third row 406 provides information about third trajectory "T3", which corresponds with a device oriented in a "gaming" position, e.g., while the particular gaming application 109 is being executed on the communications device 100 (FIG. 1). As first row 402 further illustrates, trajectory "T1" provides tuning states for a device in a voice call position in which the device is held in position in a user's hand and the device is in contact with the user's head. These tuning states include (a) T1-initial, an initial tuning state, e.g., initial tuning state 324 (FIG. 3), (b) "T1-final", a final tuning state, e.g., final tuning state 326 (FIG. 3) and (c) several interpolated tuning states, e.g., interpolated tuning states 328 (FIG. 3), including "T1-interp1", "T1-interp2", etc., up to and including a penultimate T1-interpN state. In one embodiment, information about trajectory "T1" may include at least one programmable matching circuit element value that corresponds to a given value for the device condition in which the device is being held in position in the user's hand and is in contact with the user's head. This complex impedance value(s) provides an estimate for a current level of output impedance, based on the current device operating condition. Based on the particular current operating condition, controller 220 then provides the tuning state values to compensate for the current, estimated level of output impedance. In particular, controller 220 generates an initial tuning state (e.g., "T1-initial") if the trajectory represents a newly designated trajectory, which was not used to provide a previously generated tuning state. Following generation of an initial tuning state and subsequent impedance transformation, controller 220 receives, via feedback path, an updated detected signal level, which indicates whether the estimate successfully caused a power level of a detected signal to be adjusted towards a preset, given value, based on the impedance transformation provided. If further adjustment is required, controller 220 generates or selects one of the interpolated tuning states (e.g., "T1-interp1", "T1-interp2", etc.) to provide further impedance matching.

In one embodiment, the data stored in the table may be control information that is utilized to realize specific impedances in the tuner 222. In this case, the control information is stored in the table in place of the impedance values themselves. For example, information about trajectory T1 may include at least one programmable matching circuit element value that corresponds to a given value for the device condition in which the device is being held in the user's hand and is in contact with the user's head. This matching circuit value(s) provides a given output impedance, based on the antenna input impedance for the current device operating condition. Similarly, information about trajectories, T2 and T3, may include circuit element values corresponding to given values for body worn and gaming conditions. In one embodiment, a specific number of interpolated tuning states are pre-determined. However, a number of other tuning states may be generated by interpolation involving several of the pre-established values. This further generation of additional, interpolated tuning states may be required based on a level of sensitivity required for a particular mode of operation and/or on the level of accuracy of the estimated impedance values corresponding to operating conditions. In another embodiment, the table of FIG. 4 may include only initial and final tuning states, and all of the tuning states corresponding to interpolated states 1-N are calculated by controller 220.

Selection of second trajectory T2 or third trajectory T3 is dependent on the current operating state of the communications device, and each trajectory similarly provides a plurality of selectable tuning states interpolated along the trajectory from an initial tuning state to a final tuning state. It should be recognized that the presentation of three different trajectories is for illustration only and that the number of different trajectories can range from a single trajectory to any number of trajectories that can independently be associated with a particular operating condition of the communications device.

In one embodiment, TSG logic 108 causes controller 220 to switch trajectories from a first trajectory to a second trajectory if at least one of the following occurs: (a) the preceding operating condition is different from the current operating conditions; and (b) the detected signal level falls outside a preset range of values (i.e., the detected signal level is less than a minimum threshold value or larger than a maximum threshold value). If controller 220 switches from using a first trajectory that was utilized within a preceding tuning cycle to using a second trajectory for a current tuning cycle, an initial tuning state is a first tuning state generated or selected from the second trajectory.

FIG. 5 is a block diagram illustrating a power control and antenna tuning feedback circuitry, according to one embodiment. Circuit 500 comprises power amplifier 218 and power detector 506, which is coupled to an output of power amplifier 218. Circuit 500 also comprises antenna tuner 222. Power detector 506 detects the level of power delivered on the PA Out signal 514 by power amplifier 218 to antenna tuner 222. Circuit 500 further comprises power amplifier and tuner controller 220, which is connected within a feedback path between power detector 506 and power amplifier 218 and which provides a control signal to antenna tuner 222. Power amplifier receives power amplifier (PA) input 504 and provides, as an output signal, PA output 514. Antenna tuner 222 receives an RF in signal 219 from and provides, as an output signal, RF out 224, which is coupled to the antenna 118.

Power amplifier controller and tuner controller 220, which is also interchangeably referred to herein as antenna tuner controller 220 or simply controller 220, comprises tuner controller 508 and power amplifier controller 512. Power amplifier controller 512 receives, from power detector 506, a feedback value indicating a level of power being delivered to at least one antenna. In particular, power amplifier controller 512 compares the feedback value for the level of power delivered to the at least one antenna to the target level of power that is delivered to the at least one antenna in order to determine the power control value. A power amplifier controller input 518 provides an indication of the pre-determined, target level. Power amplifier controller 512 forwards the power control signal 510 to power amplifier 218. Power amplifier controller 512 uses power control signal 510 to trigger power amplifier 218 to generate an output power signal to compensate for the feedback value being greater than or less than the pre-determined, given or target level. The output power signal that is generated to compensate for the antenna return loss causes the power delivered to the at least one antenna to approach the target level. In one embodiment, power amplifier controller 512 forwards the power control signal to tuner controller 508.

Tuner controller 508 compares the reflection power control signal to a threshold value provided by a pre-established tuner controller input signal 516 to determine whether the power control signal is larger than the threshold value. In response to the reflection coefficient value being larger than the threshold value, tuner controller 508 generates the tuning state values to reduce the antenna impedance mismatch. Thus, in general, if the power control signal, which corresponds to a level of power available from the PA to an antenna, does not match a target value, tuner controller 508 generates the tuning state values to adjust the detected signal level towards the target value. In response to a reduction of the antenna impedance mismatch resulting in a corresponding reduction in the antenna return loss, power amplifier 218 reduces the output power signal in order to maintain the required level of total radiated power from the at least one antenna. In this way the PA controller 512 and Tuner controller 508 can share a common detector 506 for feeding back delivered power. The PA controller 512 stabilizes delivered power to a pre-determined and/or pre-established, target level. The tuner controller 508 adapts antenna tuner 222 to reduce the amount of mismatch loss, and thereby minimize the amount of power that PA 218 must make available. Minimizing the amount of power that PA 218 must make available reduces energy consumption from the battery. In one embodiment, the tuner controller 508 may adapt more slowly than the PA controller 512.

In one embodiment, antenna tuner 222 receives, from antenna tuner controller 220, N control inputs for mapping the antenna impedance to a characteristic impedance value e.g., 50 ohms, at the RFin 219 signal. The antenna impedance is interchangeably referred to herein as $Z_{ANTENNA}$. In one embodiment, antenna tuner 222 may include a plurality of voltage controlled varactor diodes (not explicitly shown) that can be adjusted to provide the desired impedance transformation from $Z_{ANTENNA}$ to the characteristic impedance value. For example, antenna tuner 222 can comprise three varactors. More generally, antenna tuner 222 may provide N control variables to transform an impedance transformation from $Z_{ANTENNA}$ to any desired power amplifier (PA) load impedance, where N is two or more. In one embodiment, antenna tuner 222 comprises a plurality of tunable capacitors that the antenna tuner adjusts to transform a detected antenna impedance to an input impedance of the antenna tuner, according to the output states provided by antenna tuner controller 220. The output states are received by antenna tuner 222 as control inputs. Antenna tuner controller 220 limits the output states that are used for providing impedance transformation to states selected from points on an impedance trajectory. As previously described, the impedance trajectory can comprises (a) a first predetermined tuning state, (b) a final predetermined tuning state, and (c) other incremental tuning states that are interpolated between the first and final predetermined tuning states.

In one embodiment, the communications device (e.g., WCD 100) stores pre-established trajectories of tuning states in multiple distinct tables within persistent memory to enable antenna tuner controller 220 to efficiently search and generate tuning states. The antenna tuner controller 220 utilizes a stored, pre-established trajectory having a first tuning state for transforming a starting impedance, $Z_{ANTENNA}1$, to the characteristic impedance value (e.g., 50 ohms); and a second tuning state for transforming a second impedance, $Z_{ANTENNA}2$, to the characteristic impedance value, e.g., 50 ohms. Initially, controller 220 outputs the first tuning state. The controller 220 then incrementally adapts the tuning state that points along the trajectory between the first and second tuning states, until the feedback variable is optimized. The path between the first and second tuning states represents the adaptation trajectory.

In one embodiment, $Z_{ANTENNA}1$ may be an open space antenna impedance, and $Z_{ANTENNA}2$ may be an antenna position corresponding to the device being in a voice call position, e.g., the device is being held in a user's hand and is touching or close to the user's head. In one embodiment, a different trajectory is provided for each band, sub-band or channel associated with an active device operation. Controller 220 may utilize various adaptation trajectories, depending on the device operating conditions. For example, other trajectories may be respectively based on impedances $Z_{ANTENNA}3$ and $Z_{ANTENNA}4$, corresponding to the device being positioned in a first or second position against the user's body. Another trajectory may be based on impedance $Z_{ANTENNA}5$, which corresponds to a gaming position. In one embodiment, the antenna tuner controller 220 initially provides a tuner control output suitable to transform a first antenna impedance, $Z_{ANTENNA}1$, to the characteristic impedance value, e.g., 50 ohms. The antenna tuner controller then provides further control outputs based on incrementally adapted tuning states that are based on tuning states from a predetermined trajectory. The incrementally adapted tuning states are utilized to enhance the impedance transformation.

Figure 6:
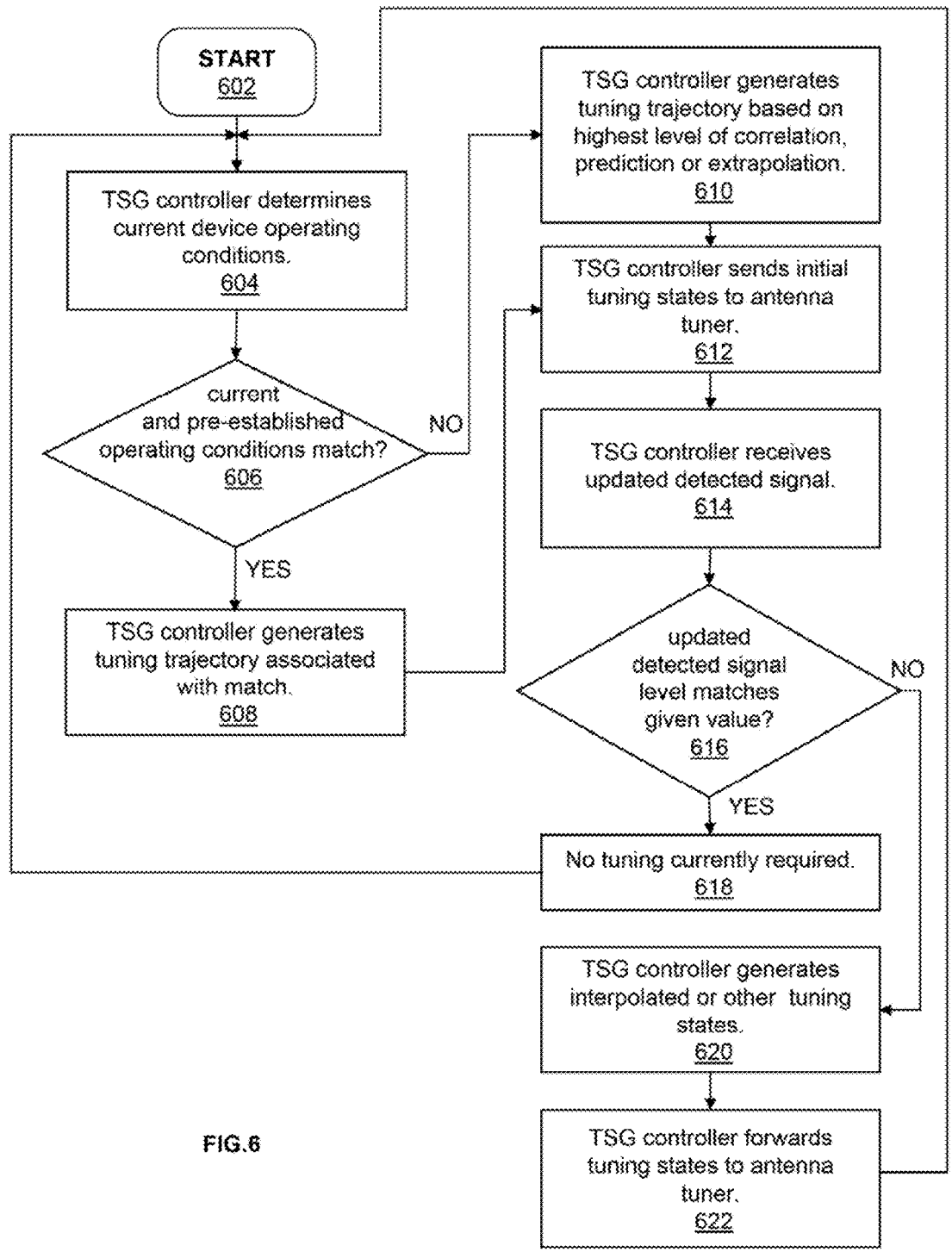
FIG. 6 is a flow chart illustrating the method for generating tuning states from pre-established trajectories of tuning states, according to one embodiment.

FIG. 6 is a flow chart illustrating the method by which the above processes of the illustrative embodiments are completed. Although the method illustrated in FIG. 6 may be described with reference to components and functionality illustrated by and described in reference to FIGS. 1-5, it should be understood that this is merely for convenience and alternative components and/or configurations thereof can be employed when implementing the various methods. Certain functions within the methods may be completed by TSG logic 108 executing on one or more processors, such as processor 110 or DSP 114 within WCD 100 (FIG. 1) or the functions can be completed by controller 120/220. The executed processes then control specific operations of or on WCD 100. For simplicity in describing the methods, all method processes and/or functions are described from the perspective of controller 120/220.

FIG. 6 illustrates the method for generating tuning states from pre-established trajectories of tuning states, according to one embodiment. The method begins at initiator block 602 and proceeds to block 604 at which TSG logic 108 executing within controller 220 determines a current device operating condition(s). The process moves to decision block 610, at which, controller 220 determines whether the current operating conditions match one of the pre-established operating conditions.

If, at decision block 606, controller 220 determines that the current operating conditions match a particular pre-established operating condition, controller 220 generates a trajectory associated with a pre-established operating condition that matches the current operating condition, as shown at block 612. However, if, at decision block 606, controller 220 determines that the current operating condition does not match any of the pre-established operating conditions, controller 220, at block 616, generates a trajectory based on specific characteristics associated with the available trajectories. Controller 220 selects one of: (a) a first trajectory that is associated with a specific pre-identified operating condition that has a highest level of correlation with the current operating condition; (b) a second trajectory that is predicted based on a current trend in operating conditions and on recent trajectories utilized, which second trajectory corresponds to a pre-identified operating condition that has at least a threshold level of correlation with the current operating conditions; and (c) a new trajectory of tuning state values generated by extrapolation of at least one pre-established trajectory that corresponds to a selected pre-identified operating condition. With the generation of a new trajectory, the selected pre-identified operating conditions would have to satisfy a preset minimum threshold level of correlation with the current operating conditions, and the newly generated trajectory and the corresponding constituent tuning states are calculated based on a determined level of correlation between the selected pre-identified operating conditions and the current operating conditions. In particular, in one embodiment, the newly generated trajectory may be derived by utilizing the determined level of correlation to extrapolate one or more of the complex impedance values that correspond to the selected pre-identified operating condition(s).

At block 612, controller 220 sends the initial tuning state to antenna tuner 222 to enable antenna tuner 222 to perform impedance matching using the initial tuning state. At block 614, controller 220 receives an updated detected signal level. At decision block 616, controller 220 determines whether the updated detected signal level matches the preset given value. If at decision block 616 controller 220 determines that the updated reflection coefficient value does not match the preset given value, the process moves to block 620, at which controller 220 generates an interpolated or other, initial tuning state. The process moves to block 622, at which controller 220 forwards the tuning state to antenna tuner 222, and the process then returns to block 604.

In one embodiment, controller 220 generates an interpolated tuning state if an initial tuning state was previously generated using the same trajectory and no other trajectory interrupted the use of the same trajectory.

Referring again to block 622, if, at decision block 622, controller 220 determines that the updated detected signal level matches the preset given value, the process moves to block 624, at which controller 220 determines that no tuning is currently required. As a result, TSG logic 108/controller 220 does not currently generate any tuning states, and the process then returns to block 604.

The flowchart and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

In some implementations, certain processes of the methods are combined, performed simultaneously or in a different order, or perhaps omitted, without deviating from the spirit and scope of the invention. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A communications device comprising:
   at least one radio transceiver;
   at least one antenna that has an input impedance which varies in response to changes in operating conditions of the communications device;
   an antenna tuner coupled between the at least one radio transceiver and the at least one antenna;
   a persistent memory which stores a plurality of pre-established trajectories of antenna tuning states and a corresponding plurality of pre-identified device operating conditions and communications modes; and
   an antenna tuner controller connected within a feedback configuration that provides the antenna tuner controller with detected signal levels and determines a current operating condition of the communications device, wherein at least one of said detected signal levels is utilized by the antenna tuner controller to generate antenna tuning states that the antenna tuner controller forwards to the antenna tuner to adjust the at least one detected signal level towards a given value, wherein the generated antenna tuning states represent a sequence of points along a selected, pre-established trajectory of tuning states that corresponds to a particular pre-identified operating condition that best matches the current operating condition.

2. The communications device of claim 1, wherein:
in response to determining that the current operating condition does not match any of the pre-identified operating conditions, the controller generates tuning states using values selected from at least one of: (a) a first trajectory that is associated with a specific pre-identified operating condition that has a highest level of correlation with the current operating condition; and (b) a second trajectory that is predicted based on a current trend in operating conditions and a corresponding set of previous trajectories utilized, wherein the second trajectory corresponds to a pre-identified operating condition that has at least a threshold level of correlation with the current operating conditions.

3. The communications device of claim 1, wherein the trajectory of tuning states comprises (a) an initial preset tuning state and a final preset tuning state and (b) a plurality of other tuning states that are interpolated between the initial and the final preset tuning states and the antenna tuner controller:
selects a first tuning state from the selected trajectory;
forwards the first tuning state to the antenna tuner;
receives a first detected signal level;
selects a second tuning state from the selected trajectory based on the initial tuning state and the first detected signal level;
forwards the second tuning state to the antenna tuner;
receives a second detected signal level;
generates a next tuning state based on the detected signal levels and at least one of: (a) the first tuning state; and (b) the second tuning state; and
forwards the next tuning state to the antenna tuner.

4. The communications device of claim 3 wherein:
the next tuning state is one of (a) a sequentially higher tuning state within the selected trajectory than a previously selected sequential tuning state that was sent to the antenna tuner and (b) a sequentially lower tuning state than the previously selected sequential tuning state;
the antenna tuner controller selects the sequentially higher tuning state as the next tuning state in response to one of the following sets of conditions: (i) the previously selected sequential tuning state is a sequentially increasing tuning state from the first tuning state and the second detected signal level exceeds the first detected signal level; and (ii) the previously selected sequential tuning state is a sequentially decreasing tuning state from the first tuning state and the second detected signal level is less than the first detected signal level; and
the antenna tuner controller selects the sequentially lower tuning state as the next tuning state in response to at least one the following sets of conditions: (i) the previously selected sequential tuning state is a sequentially increasing tuning state from the first tuning state and the second detected signal level is less than the first detected signal level; and (ii) the previously selected sequential tuning state is a sequentially decreasing tuning state from the first tuning state and the second detected signal level exceeds the first detected signal level;
wherein at least the second tuning state and the next tuning state are interpolated tuning states.

5. The communications device of claim 1, wherein:
the plurality of pre-established trajectories of tuning states and a corresponding plurality of pre-identified device operating conditions and communications modes are stored in distinct tables within the persistent memory to enable the antenna tuner controller to efficiently search for and generate tuning states.

6. The communications device of claim 1, wherein:
the given value is one of: (a) a maximum value, wherein said detected signal represents at least one of a delivered power to the antenna and a delivered power to the antenna match provided by the antenna tuner; and (b) a minimum value, wherein said detected signal represents at least one of a reflected power from the antenna match, a return loss magnitude and a standing wave ratio.

7. A transceiver integrated circuit comprising:
at least one radio transceiver;
an antenna tuner coupled between the at least one radio transceiver and at least one antenna, wherein the at least one antenna has an input impedance which varies in response to changes in operating conditions of communications device;
a persistent memory which stores a plurality of pre-established trajectories of antenna tuning states and a corresponding plurality of pre-identified device operating conditions and communications modes; and
an antenna tuner controller connected within a feedback configuration that provides the antenna tuner controller with detected signal levels and determines a current operating condition of the communications device, wherein at least one of said detected signal levels is utilized by the antenna tuner controller to generate antenna tuning states that the antenna tuner controller forwards to the antenna tuner to adjust the at least one detected signal level towards a given value, wherein the generated antenna tuning states represent a sequence of points along a selected, pre-established trajectory of tuning states that corresponds to a particular pre-identified operating condition that best matches the current operating condition.

8. The transceiver integrated circuit of claim 7, wherein:
in response to determining that the current operating condition does not match any of the pre-identified operating conditions, the controller generates tuning states using values selected from at least one of: (a) a first trajectory that is associated with a specific pre-identified operating condition that has a highest level of correlation with the current operating condition; and (b) a second trajectory that is predicted based on a current trend in operating conditions and a corresponding set of previous trajectories utilized, wherein the second trajectory corresponds to a pre-identified operating condition that has at least a threshold level of correlation with the current operating conditions.

9. The transceiver integrated circuit of claim 7, wherein the trajectory of tuning states comprises (a) an initial preset tuning state and a final preset tuning state and (b) a plurality of other tuning states that are interpolated between the initial and the final preset tuning states, and the antenna tuner controller:
selects a first tuning state from the selected trajectory;
forwards the first tuning state to the antenna tuner;
receives a first detected signal level;

selects a second tuning state from the selected trajectory based on the initial tuning state and the first detected signal level;
forwards the second tuning state to the antenna tuner;
receives a second detected signal level;
generates a next tuning state based on the detected signal levels and at least one of: (a) the first tuning state; and (b) the second tuning state; and
forwards the next tuning state to the antenna tuner.

10. The transceiver integrated circuit of claim 9, wherein:
the next tuning state is one of (a) a sequentially higher tuning state within the selected trajectory than a previously selected sequential tuning state that was sent to the antenna tuner and (b) a sequentially lower tuning state than the previously selected sequential tuning state;
the antenna tuner controller selects the sequentially higher tuning state as the next tuning state in response to one of the following sets of conditions: (i) the previously selected sequential tuning state is a sequentially increasing tuning state from the first tuning state and the second detected signal level exceeds the first detected signal level; and (ii) the previously selected sequential tuning state is a sequentially decreasing tuning state from the first tuning state and the second detected signal level is less than the first detected signal level; and
the antenna tuner controller selects the sequentially lower tuning state as the next tuning state in response to at least one the following sets of conditions: (i) the previously selected sequential tuning state is a sequentially increasing tuning state from the first tuning state and the second detected signal level is less than the first detected signal level; and (ii) the previously selected sequential tuning state is a sequentially decreasing tuning state from the first tuning state and the second detected signal level exceeds the first detected signal level;
wherein at least the second tuning state and the next tuning state are interpolated tuning states.

11. The transceiver integrated circuit of claim 7, wherein:
the plurality of pre-established trajectories of tuning states and a corresponding plurality of pre-identified device operating conditions and communications modes are stored in multiple distinct tables within the persistent memory to enable the antenna tuner controller to efficiently search for and generate tuning states.

12. The transceiver integrated circuit of claim 7, wherein:
the given value is one of: (a) a maximum value, wherein said detected signal represents at least one of a delivered power to the antenna and a delivered power to the antenna match provided by the antenna tuner; and (b) a minimum value, wherein said detected signal represents at least one of a reflected power from the antenna match, a return loss magnitude and a standing wave ratio.

13. In a transceiver integrated circuit, a method comprising:
determining at least one detected signal level which indicates a level of power being delivered to at least one antenna;
determining a current operating condition of communications device;
storing a plurality of pre-established trajectories of tuning states and a corresponding plurality of pre-identified device operating conditions and communications modes; and
an antenna tuner controller generating, based on the at least one detected signal level, antenna tuning states to adjust the level of power corresponding to the at least one detected signal level towards a preset, given value, wherein the generated antenna tuning states represent a sequence of points along a selected, pre-established trajectory of tuning states that corresponds to a particular pre-identified operating condition that best matches the current operating condition;
further wherein the pre-established trajectory of tuning states comprises (a) an initial preset tuning state and a final preset tuning state and (b) a plurality of other tuning states that are interpolated between the initial and the final preset tuning states.

14. The method of claim 13, further comprising:
wherein the plurality of pre-established trajectories of tuning states and a corresponding plurality of pre-identified device operating conditions and communications modes are stored in distinct tables within the persistent memory to enable the antenna tuner controller to efficiently search for and generate tuning states.

15. The method of claim 13, further comprising:
in response to determining that the current operating condition does not match any of the pre-identified operating conditions, generating tuning states using values selected from at least one of: (a) a first trajectory that is associated with a specific pre-identified operating condition that has a highest level of correlation with the current operating condition; and (b) a second trajectory that is predicted based on a current trend in operating conditions and a corresponding set of previous trajectories utilized, wherein the second trajectory corresponds to a pre-identified operating condition that has at least a threshold level of correlation with the current operating conditions.

16. The method of claim 13, the trajectory of tuning states comprises (a) an initial preset tuning state and a final preset tuning state and (b) a plurality of other tuning states that are interpolated between the initial and the final preset tuning states, and the method further comprising:
selecting a first tuning state from the selected trajectory;
forwarding the first tuning state to the antenna tuner;
receiving a first detected signal level;
selecting a second tuning state from the selected trajectory based on the initial tuning state and the first detected signal level;
forwarding the second tuning state to the antenna tuner;
receiving a second detected signal level;
generating a next tuning state based on the detected signal levels and at least one of: (a) the first tuning state; and (b) the second tuning state; and
forwarding the next tuning state to the antenna tuner.

17. The method of claim 16, wherein:
the next tuning state is one of (a) a sequentially higher tuning state within the selected trajectory than a previously selected sequential tuning state that was sent to the antenna tuner and (b) a sequentially lower tuning state than the previously selected sequential tuning state;
the antenna tuner controller selects the sequentially higher tuning state as the next tuning state in response to one of the following sets of conditions: (i) the previously selected sequential tuning state is a sequentially increasing tuning state from the first tuning state and the second detected signal level exceeds the first detected signal level; and (ii) the previously selected sequential tuning state is a sequentially decreasing tuning state from the first tuning state and the second detected signal level is less than the first detected signal level; and
the antenna tuner controller selects the sequentially lower tuning state as the next tuning state in response to at least one the following sets of conditions: (i) the previously selected sequential tuning state is a sequentially increasing tuning state from the first tuning state and the second detected signal level is less than the first detected signal level; and (ii) the previously selected sequential tuning state is a sequentially decreasing tuning state from the first tuning state and the second detected signal level exceeds the first detected signal level;

wherein at least one of the second tuning state and the next tuning state is an interpolated tuning state.

18. The method of claim 13, wherein:

the given value is one of: (a) a maximum value, wherein said detected signal represents at least one of a delivered power to the antenna and a delivered power to the antenna match provided by the antenna tuner; and (b) a minimum value, wherein said detected signal represents at least one of a reflected power from the antenna match, a return loss magnitude and a standing wave ratio.

* * * * *